(12) United States Patent
Ludvig et al.

(10) Patent No.: US 7,571,250 B2
(45) Date of Patent: Aug. 4, 2009

(54) METHOD AND APPARATUS FOR DISTRIBUTING MESSAGES

(75) Inventors: Edward A. Ludvig, Redwood City, CA (US); Erik C Mikkelson, Fremont, CA (US); Todd A. Lund, Santa Clara, CA (US); Liam P. O'Gorman, Novato, CA (US); Sukesh H. Pai, Mountainview, CA (US)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 11/036,970

(22) Filed: Jan. 14, 2005

(65) Prior Publication Data

US 2006/0161679 A1 Jul. 20, 2006

(51) Int. Cl.
*G06F 15/173* (2006.01)
*G06F 15/16* (2006.01)
*H04N 7/173* (2006.01)

(52) U.S. Cl. .................. 709/240; 709/235; 709/207; 725/116; 725/121

(58) Field of Classification Search .......... 709/224, 709/230, 232, 238, 240, 247; 725/118, 121
See application file for complete search history.

(56) References Cited

U.S. PATENT DOCUMENTS

| | | | | |
|---|---|---|---|---|
| 5,109,384 A | * | 4/1992 | Tseung | 714/748 |
| 5,696,765 A | * | 12/1997 | Safadi | 370/436 |
| 5,892,910 A | * | 4/1999 | Safadi | 709/217 |
| 5,933,655 A | * | 8/1999 | Vrabec et al. | 710/60 |
| 5,987,518 A | * | 11/1999 | Gotwald | 709/230 |
| 6,546,017 B1 | * | 4/2003 | Khaunte | 370/412 |
| 6,603,738 B1 | * | 8/2003 | Kari et al. | 370/230.1 |
| 6,785,564 B1 | * | 8/2004 | Quigley et al. | 455/574 |
| 6,816,458 B1 | * | 11/2004 | Kroon | 370/235 |
| 6,816,886 B2 | * | 11/2004 | Elvanoglu et al. | 709/206 |
| 6,885,675 B1 | * | 4/2005 | Gibbings | 370/433 |
| 6,956,865 B1 | * | 10/2005 | Khaunte et al. | 370/442 |
| 6,996,064 B2 | * | 2/2006 | Klassen et al. | 370/238 |
| 6,999,414 B2 | * | 2/2006 | Gummalla et al. | 370/230 |
| 7,222,255 B1 | * | 5/2007 | Claessens et al. | 714/4 |
| 7,239,879 B2 | * | 7/2007 | Avidor et al. | 455/456.5 |
| 7,328,231 B2 | * | 2/2008 | LaCroix et al. | 709/200 |
| 7,359,971 B2 | * | 4/2008 | Jorgensen | 709/226 |
| 2004/0031052 A1 | * | 2/2004 | Wannamaker et al. | 725/61 |
| 2005/0018611 A1 | * | 1/2005 | Chan et al. | 370/241 |
| 2007/0116024 A1 | * | 5/2007 | Zhang et al. | 370/412 |

\* cited by examiner

*Primary Examiner*—Kevin Bates
(74) *Attorney, Agent, or Firm*—Lee & Hayes, PLLC

(57) ABSTRACT

A procedure identifies multiple messages to distribute via a cable television network. The procedure determines first performance data associated with a downstream subnetwork and determines second performance data associated with an upstream subnetwork. The plurality of messages are prioritized based on the first performance data and the second performance data. The procedure sends a highest-ranked message among the plurality of messages to a destination device.

20 Claims, 5 Drawing Sheets

| Performance Monitor |  |
|---|---|
| OM3: Running at 58.50% (Sent 100000 Messages -> 58500 Succeeded) | |
| OM2: Running at 56.00% (Sent 100000 Messages -> 56000 Succeeded) | |
| OM5: Running at 54.75% (Sent 100000 Messages -> 54750 Succeeded) | |
| - | RPD2: Running at 86.50% (Sent 1000 Messages -> 865 Succeeded) |
| - | RPD1: Running at 78.00% (Sent 1000 Messages -> 780 Succeeded) |
| - | RPD3: Running at 77.20% (Sent 1000 Messages -> 772 Succeeded) |
| - | ... |
| OM4: Running at 54.00% (Sent 100000 Messages -> 54000 Succeeded) | |
| OM1: Running at 53.50% (Sent 100000 Messages -> 53500 Succeeded) | |
| ... | |

METHOD AND APPARATUS FOR DISTRIBUTING MESSAGES

TECHNICAL FIELD

The systems and methods described herein relate to prioritizing messages for distribution via a network, such as a cable television network, based on the performance of different portions of the network.

BACKGROUND

Cable television systems generate different types of messages that are distributed from a headend to one or more set top boxes via a cable television network. These messages include general messages that are broadcast to multiple set top boxes as well as targeted messages that are addressed to a particular set top box. Targeted messages may include, for example, billing information, new account information, and security settings. Targeted messages are bandwidth intensive because they are sent exclusively to each set top box. These targeted messages are necessary for messages containing private information.

Problems may occur when messages are sent to set top boxes that are offline due to a power failure, a network failure, or the like. For example, a large number of targeted messages sent to offline set top boxes consumes network bandwidth without actually delivering the targeted messages to the appropriate set top boxes. These undelivered messages will need to be re-sent at a future time, which consumes additional network bandwidth.

Additionally, the number of outstanding (i.e., unacknowledged) targeted messages are typically limited by the cable television system. When the maximum number of outstanding targeted messages is reached, additional targeted messages cannot be distributed until one or more of the outstanding targeted messages is acknowledged or reaches a time-out value and is designated as undelivered. Thus, sending too many targeted messages to offline set top boxes can significantly increase the time to distribute a group of targeted messages. For example, waiting for time-outs to occur before resending subsequent messages reduces the overall message throughput.

Therefore, it would be desirable to provide a system that prioritizes targeted messages based on knowledge of offline set top boxes in different parts of the cable television network as well as the integrity of different portions of the network.

SUMMARY

The systems and methods described herein prioritize multiple messages to be distributed via a cable television network. A procedure determines first performance data associated with a downstream subnetwork and second performance data associated with an upstream subnetwork. The multiple messages are prioritized based on the first performance data and the second performance data. A highest-ranked message among the multiple messages is sent to a destination device.

In a particular embodiment, the procedure further determines a performance associated with the sent messages and updates the first performance data and/or the second performance data based on the performance associated with the sent messages.

Other embodiments reprioritize the multiple messages based on the updated first performance data and/or the updated second performance data.

BRIEF DESCRIPTION OF THE DRAWINGS

Similar reference numbers are used throughout the figures to reference like components and/or features.

FIG. 4 illustrates an example display screen containing performance data associated with out-of-band modulators and return path demodulators.

DETAILED DESCRIPTION

The systems and methods described herein prioritize messages distributed to one or more set top boxes based on, for example, the online status of the set top boxes (e.g., whether the set top boxes are online or offline). These systems and methods monitor the online status of individual set top boxes as well as groups of set top boxes, such as set top boxes coupled to a particular portion of a distribution network or set top boxes associated with a particular network component, such as a particular out-of-band modulator. The manner in which messages are prioritized may change as information regarding the status of various set top boxes is updated.

The systems and methods described herein are capable of enhancing the rate at which messages are distributed to set top boxes. By prioritizing messages based on the online status of the set top boxes, messages are more likely to be successfully received by the appropriate set top boxes, thereby reducing the likelihood that messages will need to be resent.

Particular examples discussed herein refer to specific components in a cable television network environment. However, the systems and methods discussed herein may be utilized with other components contained in similar or different operating environments.

Figure 1:
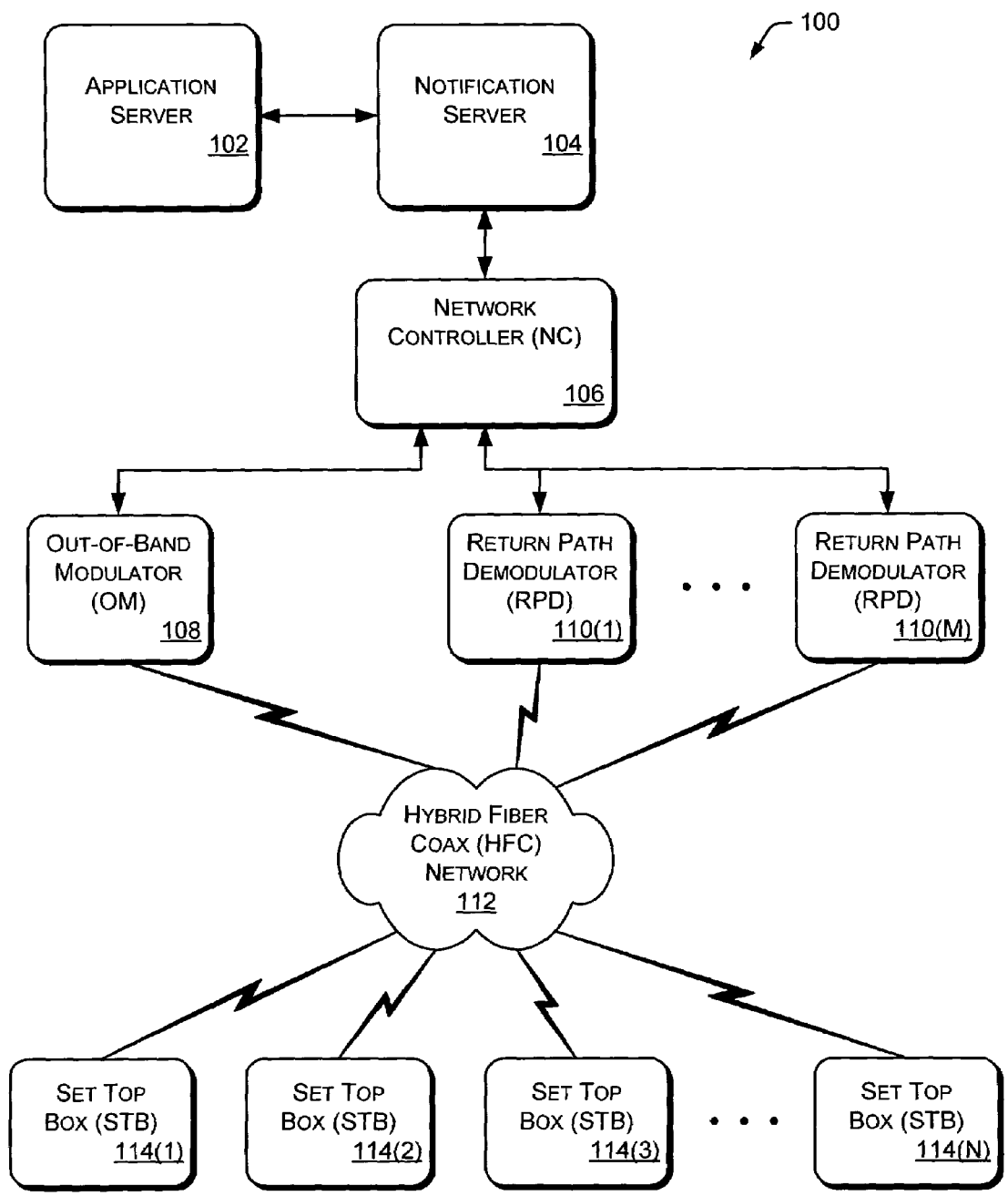
FIG. 1 is a block diagram showing selected components in an example cable television network environment.

FIG. 1 is a block diagram showing selected components in an example cable television network environment 100. In a particular embodiment, cable television network environment 100 is an interactive cable television network that provides two-way communication between the headend and multiple set top boxes 114. Interactive cable television networks support various interactive features such as interactive program guides, video-on-demand (VOD), interactive games, banking services and shopping services. A typical interactive cable television network contains set top boxes that support interactive television features as well as set top boxes that do not support interactive television features.

An application server 102 is coupled to a notification server 104. Application server 102 resides at the cable system headend and contains one or more application programs related to the cable television network environment 100. These application programs include, for example, account billing applications and security-related applications. Notification server 104 receives messages from application server 102 and queues the received messages. Notification server 104 is coupled to a network controller 106. Notification server 104 prioritizes the received messages for distribution based on responses from messages previously sent through the network controller 106. This results in the ability to track the online status of set top boxes in different portions of the network. Network controller 106 routes traffic in the cable television network environment 100, assigns addresses (e.g., device IDs) to set top boxes, monitors the time required for messages to be acknowledged by the receiving set top boxes, and monitors the maximum number of simultaneously outstanding messages. Although one network controller 106 is shown in FIG. 1, alternate environments 100 may include any number of network controllers 106.

As shown in FIG. 1, network controller 106 is coupled to an out-of-band modulator 108 and multiple return path demodulators 110. "Out-of-band" data refers to data that is transmitted on an independent dedicated carrier for the purpose of communicating, for example, between a cable system headend (or data center equipment) and cable system set top boxes. The out-of-band channel allows set top boxes to communicate with the cable system headend regardless of which television channel the set top box is tuning. For example, the out-of-band data may include control signals, targeted messages, program guide information, firmware upgrades, and other data that is not part of the content contained in the broadcast television channels. Out-of-band data may be transmitted using frequencies outside the frequency range of the broadcast television channels. Alternatively, out-of-band data can be transmitted using frequencies located in the gaps between the broadcast television channel frequencies. In particular embodiments, out-of-band data is also repeated on signal carriers used primarily for broadcasting television signals.

Out-of-band modulator 108 communicates data on one or more out-of-band downstream channels. Out-of-band modulator 108 is a communication device that communicates data via a downstream node or portion of the distribution network. "Downstream channels" refer to channels that communicate data from network controller 108 toward multiple set top boxes 114. For example, out-of-band modulator 108 sends targeted messages received from network controller 106 to appropriate set top boxes 114. Out-of-band modulator 108 may also be referred to as a "downstream node", a "downstream plant", or "downstream communication device". Return path demodulators 110 communicate data on one or more out-of-band upstream channels. Return path demodulator 110 is a communication device that communicates data via an upstream node or portion of the distribution network. "Upstream channels" refer to channels that communicate data from set top boxes 114 toward network controller 108. Return path demodulator 110 may also be referred to as an "upstream node", an "upstream plant", or an "upstream communication device". Certain set top boxes 114 include two tuners—one tuner to tune television channels and another tuner to tune out-of-band data.

Although one out-of-band modulator 108 is shown in FIG. 1, a typical cable television network environment 100 includes multiple out-of-band modulators 108, each having multiple associated return path demodulators 110. This arrangement is discussed in greater detail below with respect to FIG. 2.

Out-of-band modulator 108 and the multiple return path demodulators 110 are coupled to a Hybrid Fiber Coax (HFC) network 112. HFC network 112 is capable of communicating video data, audio data, telephony data, interactive services data, targeted messages, and the like between various components in cable television network environment 100.

Multiple set top boxes 114 are coupled to HFC network 112. Each set top box has a unique device ID that functions in a manner similar to a Media Access Control (MAC) address in data networks. The device ID may also be referred to as a "unit address". The device ID allows targeted messages to be delivered to a specific set top box.

In the embodiment of FIG. 1, application server 102, notification server 104 and network controller 106 may be referred to collectively as the "headend". Alternatively, application server 102, notification server 104 and network controller 106 may be referred to collectively as a data center that contains servers and other equipment that may address multiple headends. The remaining components (out-of-band modulator 108, return path demodulators 110, HFC network 112 and set top boxes 114) may be referred to collectively as the "cable television network". Alternate embodiments of cable television network environment 100 may include other systems, such as VOD systems, and/or other television devices in addition to (or instead of) set top boxes 114. These television devices include Digital Video Recorders (DVRs), game consoles, and the like. Further, set top box functionality may be incorporated into a display device (e.g., a television or monitor) or other component.

In a particular embodiment of cable television network environment 100, notification server 104 is running Microsoft TV FOUNDATION EDITION developed by Microsoft Corporation of Redmond, Washington. Microsoft TV FOUNDATION EDITION is a digital cable platform that supports a wide range of services and features on a variety of set top boxes and other television devices. Microsoft TV FOUNDATION EDITION includes client software components that runs on one or more set top boxes 114 and server software components that run in the cable headend or data center.

In a specific implementation of cable television network environment 100, network controller 106 is a model NC-1500 network controller available from Motorola, Inc. of Schaumburg, Ill. Additionally, out-of-band modulator 108 is a model OM-1000 out-of-band modulator and return path demodulator 110 is a model RPD-1000 return path demodulator, both available from Motorola, Inc.

Figure 2:
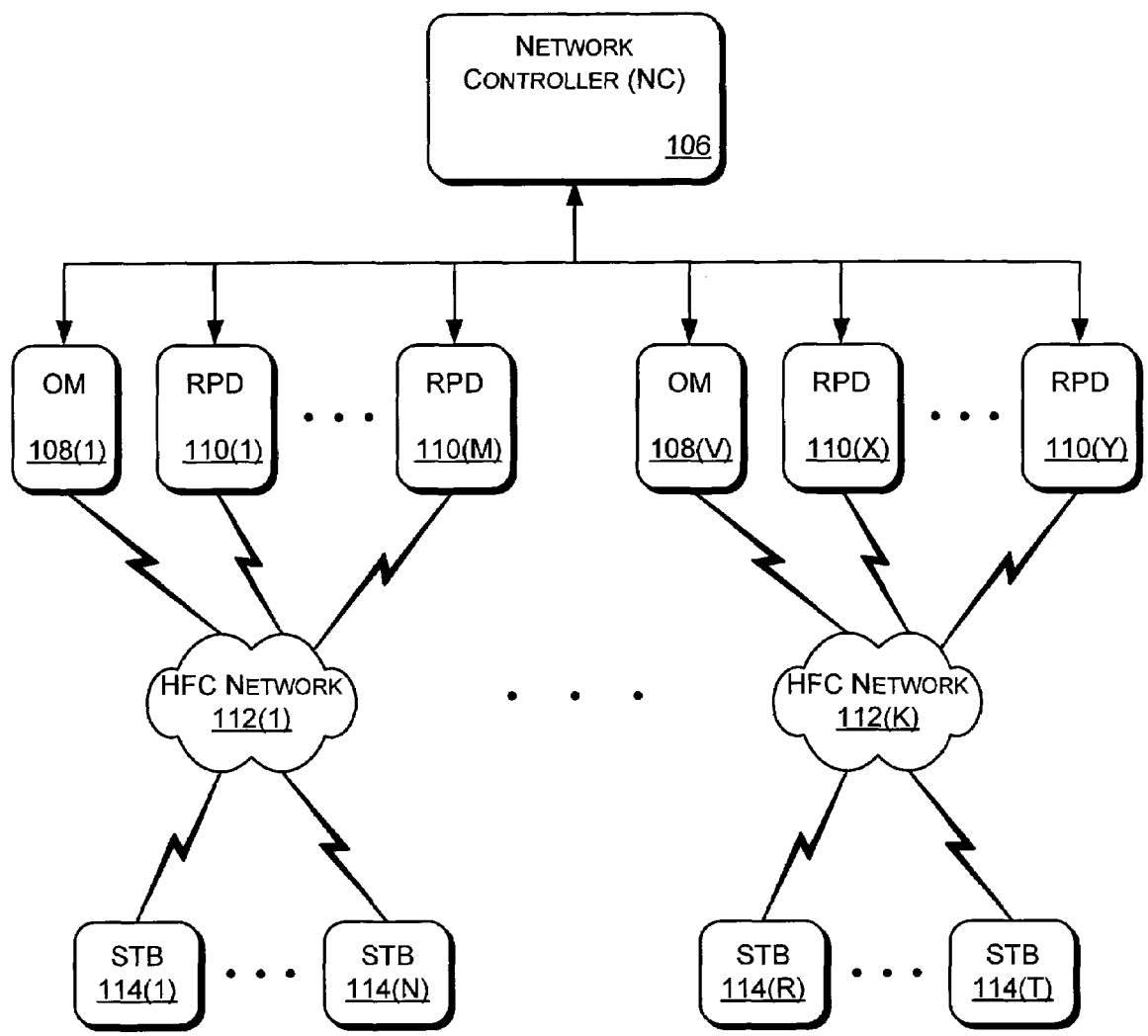
FIG. 2 illustrates an example arrangement of multiple out-of-band modulators and multiple return path demodulators coupled to multiple set top boxes via one or more HFC networks.

FIG. 2 illustrates an example arrangement of multiple out-of-band modulators (OM) 108 and multiple return path demodulators (RPDs) 110 coupled to multiple set top boxes (STBs) 114 via one or more HFC networks 112. In particular embodiments, each out-of-band modulator 108 can support a maximum of approximately 50,000-70,000 set top boxes 114. Similarly, each return path demodulator 110 can support a maximum of approximately 150-1000 set top boxes 114, depending on the services provided to the set top boxes. For example, if many of the set top boxes utilize video-on-demand (VOD) services, then the associated return path demodulator 110 can only support approximately 150 set top boxes due to the high return path bandwidth required to support VOD services.

The number of set top boxes 114 supported by return path demodulators 110 is also limited by signal-to-noise constraints on the return path. Each set top box 114 introduces noise from its power supply onto the return path. The noise on the return path degrades the signal quality and can result in erroneous data. Thus, the number of set top boxes 114 coupled to each return path (i.e., each return path demodulator 110) is limited to maintain an acceptable signal-to-noise ratio.

Since one out-of-band modulator 108 can support significantly more set top boxes than a single return path demodulator 110, multiple return path demodulators 110 are associated with each out-of-band modulator 108. As shown in FIG. 2, return path demodulators 110(1) through 110(M) are associated with out-of-band modulator 108(1). Similarly, return path demodulators 110(X) through 110(Y) are associated with out-of-band modulator 108(V). The number of out-of-band modulators 108 contained in a particular cable television network environment varies based on the number of set top boxes 114 in the environment and other factors. In one embodiment, approximately 200-300 return path demodulators 110 are associated with a single out-of-band modulator 108.

Although FIG. 2 illustrates multiple HFC networks 112, alternate embodiments may include a single HFC network 112 coupled to all out-of-band modulators 108, all return path demodulators 110, and all set top boxes 114.

Table 1 below shows an example relationship between various out-of-band modulators, return path demodulators, and set top boxes in a particular cable television network environment. Although Table 1 identifies two out-of-band modulators, alternate embodiments may include any number of out-of-band modulators and associated return path demodulators. As shown in Table 1, the first out-of-band modulator is associated with 50,000 set top boxes and the second out-of-band modulator is associated with 40,000 set top boxes. Each return path demodulator associated with the first out-of-band modulator is associated with 300 set top boxes (except the last return path demodulator, which is associated with 200 set top boxes). Each return path demodulator associated with the second out-of-band modulator is associated with 200 set top boxes.

TABLE 1

| Out-of-Band Modulator 1 | STB1 | STB50,000 |
| Return Path Demod 1 | STB1 | STB300 |
| Return Path Demod 2 | STB301 | STB600 |
| Return Path Demod 3 | STB601 | STB900 |
| ... | ... | ... |
| Return Path Demod 167 | STB49,801 | STB50,000 |
| Out-of-Band Modulator 2 | STB1 | STB40,000 |
| Return Path Demod 1 | STB1 | STB200 |
| Return Path Demod 2 | STB201 | STB400 |
| Return Path Demod 3 | STB401 | STB600 |
| ... | ... | ... |
| Return Path Demod 200 | STB39,801 | STB40,000 |

Referring back to FIG. 1, messages generated by application server 102 are queued by notification server 104 and distributed by network controller 106. The messages are communicated to an out-of-band modulator 108, through HFC network 112, to a set top box 114. In a particular embodiment, messages are communicated between the headend (or data center) and the out-of-band modulator 108 via an Ethernet link. The set top box 114 then generates an acknowledgement signal that is communicated through HFC network 112 to a s return path demodulator 110, and to network controller 106.

Certain network controllers 106 limit the number of outstanding messages associated with a particular out-of-band modulator 108 and associated with a particular return path demodulator 110. "Outstanding messages" are messages that have been sent, but the sender of the message has not received an acknowledgment from the intended recipient of the message. Messages may be outstanding due to network congestion, offline set top boxes, malfunctioning network components, or malfunctioning network connections. In one embodiment, each out-of-band modulator 108 is limited to ten outstanding messages and each return path demodulator 110 is limited to one outstanding message.

Outstanding messages can reduce the overall rate at which messages are distributed to set top boxes. For example, when an out-of-band modulator 108 reaches its maximum number of outstanding messages, additional messages cannot be distributed through that out-of-band modulator until one or more outstanding messages are acknowledged or "time-out" (e.g., no response received for a specified period of time, such as 70 seconds).

Figure 3:
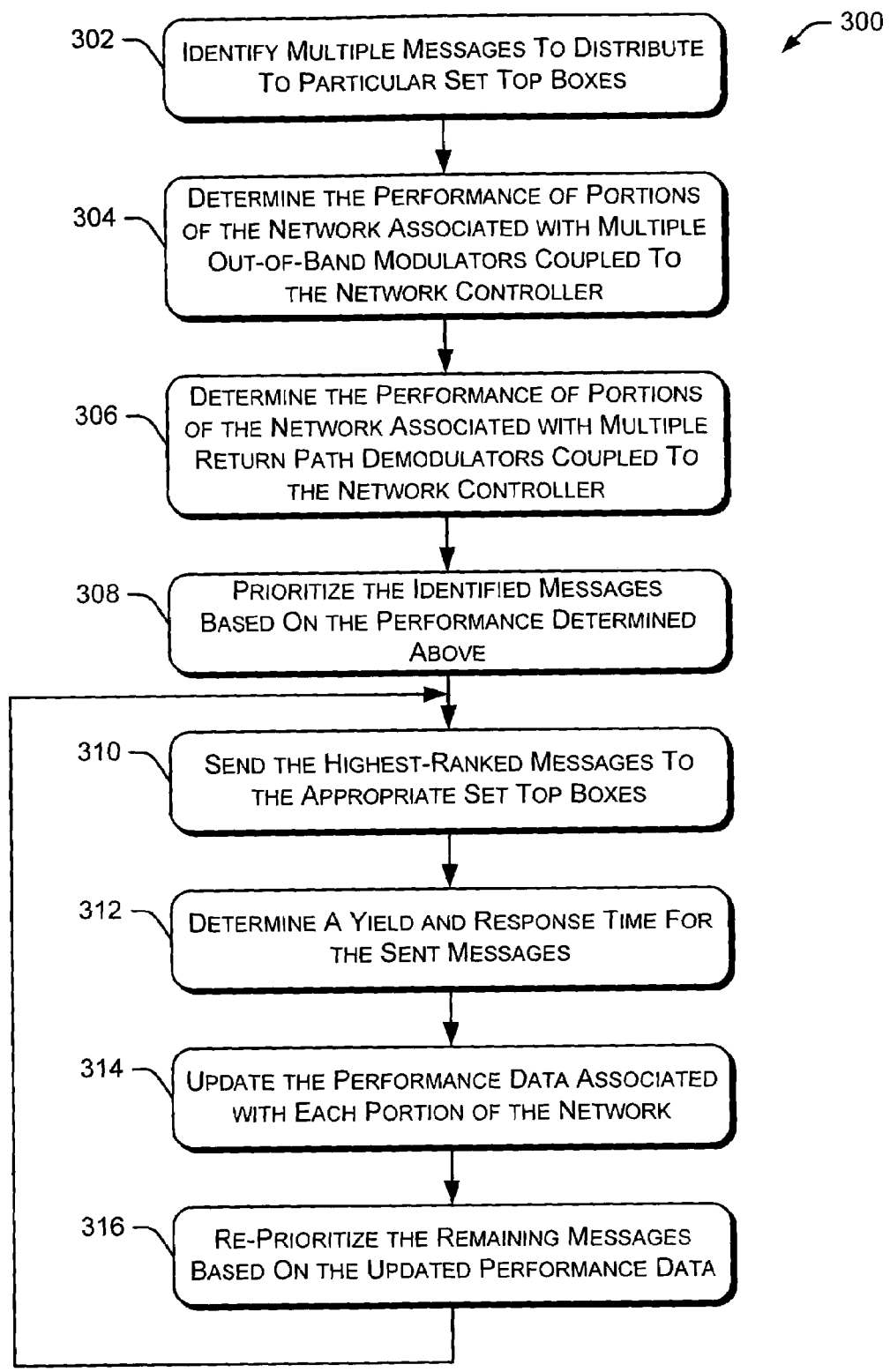
FIG. 3 is a flow diagram illustrating an embodiment of a procedure for distributing messages in a cable television network environment.

FIG. 3 is a flow diagram illustrating an embodiment of a procedure 300 for distributing messages in a cable television network environment. To improve the likelihood that a particular message will be received by a set top box 114, the systems and methods described herein monitor the performance (e.g., the successful delivery of messages and/or acknowledgements) of various portions of the network associated with out-of-band modulators 108 and return path demodulators 110, and prioritize queued messages based on the observed performance.

Initially, procedure 300 identifies multiple messages to distribute to particular set top boxes (block 302). For example, these multiple messages may be generated by application server 102 and/or queued in notification server 104. Based on the destination set top box, each message has an associated out-of-band modulator and an associated return path demodulator. Procedure 300 continues by determining the performance of portions of the network associated with multiple out-of-band modulators coupled to the network controller (block 304). Next, the procedure determines the performance of portions of the network associated with multiple return path demodulators coupled to the network controller (block 306). The performance of these portions of the network may include the yield (e.g., the percentage of messages that are successfully received by a corresponding set top box) and/or the response time (e.g., the time period between sending a message and receiving an acknowledgement that the message was received). In one embodiment, the procedure determines the performance of downstream portions of the network associated with various out-of-band modulators and the performance of upstream portions of the network associated with various return path demodulators coupled to the network controller. Performance is determined, for example, by measuring the number of acknowledgements received for a sample set of messages sent for each portion of the network. The greater the number of acknowledgements received, the higher the performance score. A portion of the network may also be referred to as a "subnet" or "subnetwork".

Procedure 300 continues by prioritizing the identified messages based on the performance determined above (block 308). For example, various portions of the network may be ranked based on yield (i.e., highest yield ranked first) or response time (i.e., shortest response time ranked first). Alternatively, the portions of the network may be ranked based on both yield and response time. In one embodiment, messages that have no response are attributed a response time of 70 seconds. This results in a ranking that incorporates both yield and response time.

After prioritizing the network portions, procedure 300 selects messages associated with the highest-ranked network portions and sends those messages to the appropriate set top boxes (block 310). Since messages are prioritized to set top boxes on the healthiest portions of the network, those messages have the highest likelihood of being successfully received by the corresponding set top boxes. The procedure monitors the messages sent in block 310 to determine a yield and/or a response time for each of the sent messages (block 312). These yields and/or response times are used to update the performance data associated with each subnet as identified by the downstream node and the upstream node (block 314). The performance data can be updated in various ways, such as weighting current performance data heavier than older performance data or maintaining a moving average of all performance data collected with respect to a particular subnet.

Finally, procedure 300 reprioritizes the remaining messages based on the updated performance data (block 316). The procedure then returns to block 310 to send the next group of highest-ranked messages to the appropriate set top boxes.

The procedure of FIG. 3 handles groups of messages and updates performance data after sending each group of messages. Alternate embodiments monitor the yield and/or response time on an ongoing basis and reprioritize the remaining messages at periodic intervals.

In a particular implementation, the initial ranking of the performance of various portions of the network may be random until actual performance data is collected from the different portions of the network.

In one embodiment, a particular portion of the network is identified as having poor performance, messages destined for set top boxes in that portion of the network will have a lower priority than messages destined for set top boxes in better-performing portions of the network. However, periodic messages are sent to set top boxes in lower-ranked portions of the network to determine whether that portion of the network is healthy again. If a previously unhealthy portion of the network improves, the ranking of messages destined for that portion of the network will be increased. Thus, when the health of a portion of the network improves, messages will begin flowing to set top boxes in that portion of the network.

A particular algorithm for identifying and prioritizing portions of the network to send messages queues all pending notifications. The queued notifications are then sorted based on the upstream node (e.g., return path demodulator) associated with the notification. The algorithm maintains a performance score associated with each upstream node. The performance score determines the rate of failure for sent messages associated with the upstream node. The response time for a particular message provides an indication of the health of the upstream node associated with the particular message. If the upstream node has failed, or the subnetwork associated with the upstream node has failed, the response time would equal the time-out interval. The higher the score, the weaker the health of the upstream node and the associated subnetwork. The performance score is averaged over the number of messages sent. Scores associated with recently sent messages are weighted more heavily than scores associated with older messages. The algorithm selects messages destined for the highest-ranked network portion. If the message queue for that network portion is empty, the algorithm selects messages destined for the next-highest-ranked network portion and begins sending those messages.

Based on the score for each portion of the network, the algorithm ranks the network portions in priority order. The network portion with the lowest score has the highest priority since a low score means that he network portion and the associated node are healthy. This prioritization determines the order in which messages are sent to set top boxes.

At periodic intervals, the algorithm sends messages associated with one or more lower-ranked network portions. Each of these messages is scored based on the response time and the overall performance score for the associated network portion is updated. Thus, the performance score of all network portions (including lower-ranked portions) are updated periodically. This process allows messages destined for subnetworks having the highest performance score to be sent before messages associated with subnetworks having a lower performance score. This enhances utilization of the available bandwidth and improves the number of successful messages sent during a particular time period.

FIG. 4 illustrates an example display screen 400 containing performance data associated with various subnetworks. Display screen 400 shows performance data associated with subnetworks that are serviced by out-of-band modulators OM1, OM2, OM3, OM4 and OM5. Additionally, display screen 400 shows performance data associated with subnetworks that are serviced by return path demodulators RPD1, RPD2 and RPD3. In this example, return path demodulators RPD1-RPD3 are associated with out-of-band modulator OM3. As shown in FIG. 4, the out-of-band modulators are ranked in order of yield (i.e., the yield of the corresponding subnet)—OM3 having the highest yield (58.50%) and OM1 having the lowest yield (53.50%). Additionally, the return path demodulators are also ranked in order of yield—RPD2 having the highest yield (86.50%) and RPD3 having the lowest yield (77.20%).

The information shown on display screen 400 is useful to, for example, network administrators who are monitoring the performance of a cable television network. By monitoring the data provided on a display screen, network administrators or other operators can identify network problems, such as power outages, component failures, etc. For example, if the yield associated with a particular subnetwork drops quickly, there may be a problem with the associated out-of-band modulator or there may be a power outage in the geographic area associated with the subnetwork.

Figure 5:
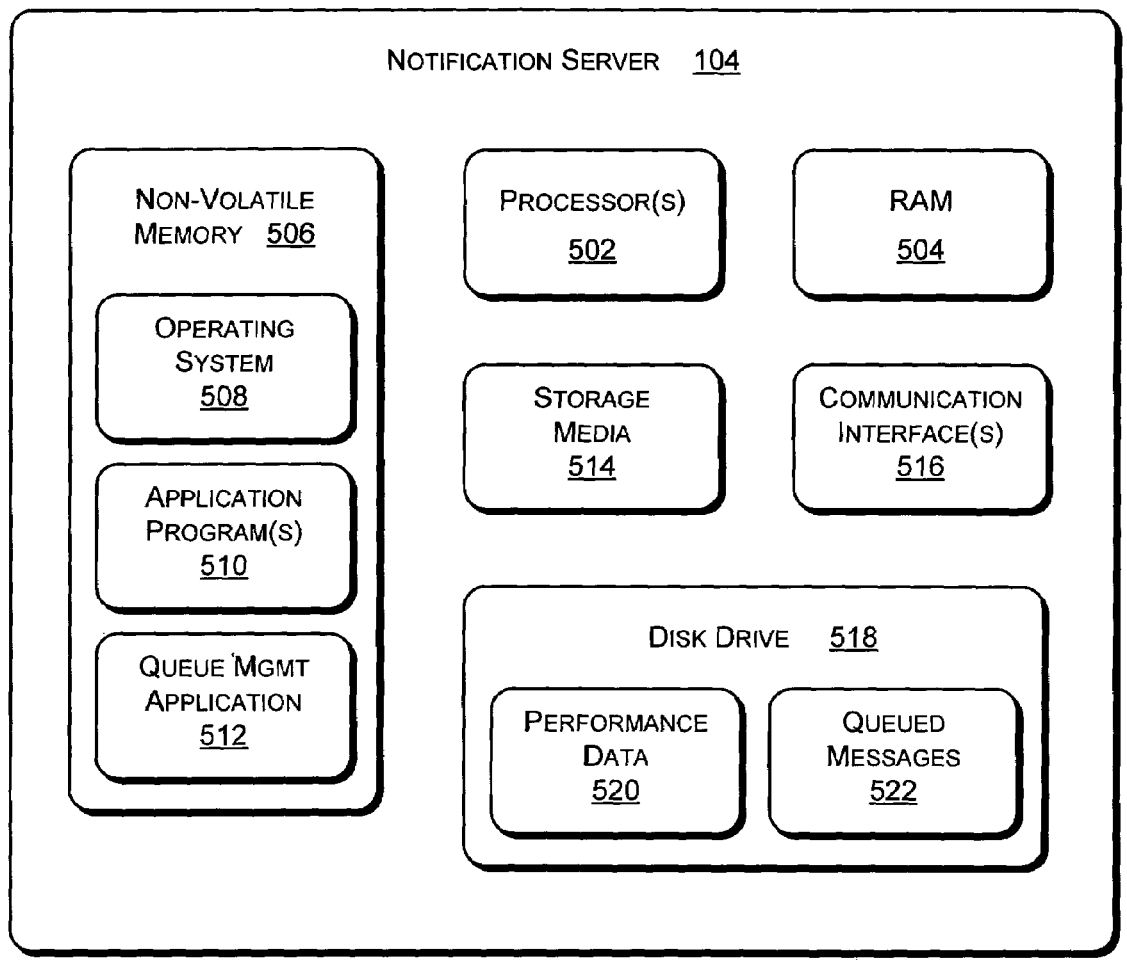
FIG. 5 is a block diagram showing selected components of an example notification server.

FIG. 5 is a block diagram showing selected components of an example notification server 104. The notification server 104 includes one or more processors 502 (e.g., any of microprocessors, controllers, and the like) that process various instructions to control the operation of notification server 104 and to communicate with other electronic and computing devices.

Notification server 104 can be implemented with one or more memory components, examples of which include a random access memory (RAM) 504, a non-volatile memory 506 (e.g., ROM, Flash, EPROM, EEPROM, etc.) mass storage media 514, and a disk drive 518. Disk drive 518 can include any type of magnetic or optical storage device, such as a hard disk drive, a magnetic tape, a rewriteable compact disc, a DVD, and the like. The one or more memory components store various information and/or other data such as operation settings, received messages, message queuing information, and/or performance data. In the embodiment of FIG. 5, disk drive 518 stores performance data 520 and queued messages 522. Alternative implementations of notification server 104 can include a range of processing and memory capabilities, and may include any number of differing memory components than those shown in FIG. 5. For example, full-resource devices can be implemented with substantial memory and processing resources, whereas low-resource devices may have limited processing and memory capabilities.

An operating system 508 and one or more application programs 510 can be stored in non-volatile memory 506 and executed on processor(s) 502 to provide a runtime environment. A runtime environment facilitates extensibility of notification server 104 by allowing various interfaces to be defined that, in turn, allow application programs 510 to interact with notification server 104.

A queue management application 512 handles prioritization and distribution of the various messages received, for example, from application server 102 (FIG. 1). This prioritization and distribution of messages is based on performance data received from one or more network controllers 106.

Notification server 104 further includes one or more communication interfaces 516. A communication interface 516 can be implemented as a serial and/or parallel interface, as a wireless interface, and/or as any other type of network interface. A wireless interface enables notification server 104 to receive control input commands and other information from a user-operated input device. A network interface and a serial and/or parallel interface enables notification server 104 to interact and communicate with other electronic and computing devices via various communication links.

Although shown separately, some of the components of notification server 104 may be implemented in an application specific integrated circuit (ASIC). Additionally, a system bus (not shown) typically connects the various components within notification server 104. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented by one or more processors executing instructions stored in one or more computer readable storage mediums, the method comprising:
    controlling a cable television network portioned into a plurality of network portions, each network portion including a plurality of destination devices;
    measuring, by one or more of the processors, a performance of each network portion based upon messages previously sent to the destination devices in that network portion;
    identifying a plurality of messages to be distributed via the cable television network by identifying the destination device and the network portion to which each message is intended to be delivered
    ranking each network portion according to the measured performance to determine a highest-ranked network portion and lower-ranked network portions, wherein network portions having a higher measured performance are ranked higher than network portions having a lower measured performance;
    prioritizing the plurality of messages, wherein the messages are ranked according to the rank of the network portion to which each message is intended to be delivered; and
    sending one or more highest-ranked messages to one or more intended destination devices in the highest-ranked network portion having the highest measured performance before sending lower-ranked messages to intended destination devices in the lower-ranked network portions having the lower measured performance.

2. A method as recited in claim 1 wherein the cable television network comprises multiple modulators and multiple demodulators, and wherein the cable television network is divided into a plurality of network portions so that each network portion includes at least one modulator and at least one demodulator.

3. A method as recited in claim 1 wherein the measuring the performance of each network portion based upon messages previously sent to the destination devices in that network portion further comprises determining a yield based upon a percentage of the messages previously sent that were successfully received by the destination devices in the network portion.

4. A method as recited in claim 1 wherein the measuring the performance of each network portion based upon messages previously sent to the destination devices in that network portion further comprises determining a response time based upon a time period between when a particular message was previously sent to a particular destination device and when an acknowledgement for that particular message was received.

5. A method as recited in claim 1 wherein the measuring the performance of each network portion based upon messages previously sent to the destination devices in that network portion further comprises measuring the performance based upon a sample set of messages previously sent for each network portion.

6. A method as recited in claim 1 wherein the measuring the performance of each network portion based upon messages previously sent to the destination devices in that network portion further comprises measuring the performance based upon both a percentage of messages previously sent that were received by the intended destination devices and response times for messages previously sent.

7. A method as recited in claim 1 further comprising:
    determining additional performance information associated with the sending of the one or more highest-ranked messages;
    updating the ranking of each network portion based on the determined additional performance information associated with the sending of the one or more highest-ranked messages to determine a next highest-ranked network portion;
    reprioritizing remaining messages of the plurality of messages based upon the updated ranking of each network portion; and
    sending one or more next-highest-ranked messages to intended destination devices in the next-highest-ranked network portion.

8. A method as recited in claim 1 further comprising
    sending periodic messages to the destination devices in the network portions;
    measuring additional performance of each network portion based upon the periodic messages to acquire updated performance data for each network portion; and
    reprioritizing the plurality of messages based on the updated performance data for each network portion.

9. A method as recited in claim 1 further comprising:
    determining that a message queue for the highest-ranked network portion is empty; and
    sending messages intended for destination devices in a next-highest-ranked network portion.

10. One or more computer-readable memories containing a computer program that is executable by a processor to perform the method recited in claim 1.

11. A method implemented by one or more processors executing instructions stored in one or more computer readable storage mediums, the method comprising:
    providing a cable television network having a controller in communication with a plurality of set top boxes via a plurality of out-of band modulators and return path demodulators, the cable television network being portioned into a plurality of network portions so that each network portion includes at least one modulator, at least one demodulator, and one or more set top boxes;

identifying a plurality of messages to distribute from the controller to the plurality of set top boxes via the cable television network by associating each message with the set top box and the network portion to which the message is intended to be delivered;

determining, by one or more of the processors, performance data associated with each of the network portions in the network based upon prior messages previously sent to the set top boxes in each network portion through the out-of-band modulators and acknowledgements received via the return path demodulators;

ranking each network portion according to the performance data to determine a highest-ranked network portion and lower-ranked network portions, wherein network portions having a higher measured performance are ranked higher than network portions having a lower measured performance;

prioritizing the plurality of messages based on the performance data, wherein the messages are ranked according to the rank of the network portion that each message is associated with;

sending the highest-ranked messages among the plurality of messages to the respective set top boxes that the highest-ranked messages are associated with by sending the one or more highest-ranked messages from the controller via the at least one out-of-band modulator for the highest-ranked network portion, wherein the highest-ranked messages destined for the network portion having the highest measured performance are sent before lower-ranked messages destined for network portions having lower measured performance;

determining a performance associated with the sending of the one or more highest-ranked messages to the highest-ranked network portion; and updating the performance data associated with the plurality of network portions based on the performance associated with the sending of the one or more highest-ranked messages.

12. A method as recited in claim 11 further comprising reprioritizing remaining messages of the plurality of messages based on the updated performance data.

13. A method as recited in claim 11 wherein the determining the performance data associated with each of the network portion based upon prior messages previously sent to the set top boxes further comprises determining a yield based upon a percentage of the prior messages previously sent that were successfully received by the set top boxes in the network portion.

14. A method as recited in claim 11 wherein the determining the performance data associated with each of the network portion based upon prior messages previously sent to the set top boxes further comprises determining a response time based upon a time period between when a particular message was previously sent to a particular set top box and when an acknowledgement for that particular message was received via a corresponding return path demodulator.

15. A method as recited in claim 11 wherein the determining the performance data associated with each of the network portion based upon prior messages previously sent to the set top boxes further comprises determining the performance data based upon a sample set of prior messages previously sent for each network portion.

16. A method as recited in claim 11 wherein the determining the performance data associated with each of the network portion based upon prior messages previously sent to the set top boxes further comprises determining the performance data based upon both a percentage of prior messages previously sent that were received by the intended destination devices and response times for prior messages previously sent.

17. One or more computer-readable memories containing a computer program that is executable by a processor to perform the method recited in claim 11.

18. One or more computer-readable storage media having stored thereon a computer program comprising instructions implemented by one or more processors for causing the one or more processors to:

control a network portioned into a plurality of network portions, each network portion including a plurality of destination devices;

measure a performance of each network portion based upon messages previously sent to the destination devices in that network portion, wherein the one or more processors measure the performance of each network portion based upon messages previously sent to the destination devices in that network portion by measuring the performance based upon at least one of:
 a percentage of messages previously sent that were received by the intended destination devices, or
 response times for messages previously sent;

identify a plurality of messages to distribute via the network by identifying the destination device and the network portion to which each message is intended to be delivered;

rank each network portion according to the measured performance to determine a highest-ranked network portion and lower-ranked network portions, wherein the network portions having higher measured performances are ranked higher than network portions having lower measured performances;

prioritize the plurality of messages, wherein the messages are ranked according to the rank of the network portion to which each message is intended to be delivered;

send one or more highest-ranked messages to one or more intended destination devices associated with a highest-ranked network portion having a highest measured performance of the network before sending lower-ranked messages to intended destination devices in the lower-ranked network portions having the lower measured performance;

determine whether the one or more highest-ranked messages were successfully delivered to the one or more intended destination devices; and reprioritize the remaining messages of the plurality of messages based on whether the one or more highest-ranked messages were successfully delivered to the destination device.

19. One or more computer-readable media as recited in claim 18 wherein the one or more processors further send one or more next highest-ranked message from the remaining messages to one or more intended destination devices associated with a next-highest ranked network portion.

20. One or more computer-readable media as recited in claim 18 wherein reprioritizing of the remaining messages further comprises the one or more processors being configured to:

determine additional performance information associated with the sending of the one or more highest-ranked messages;

update the ranking of each network portion based on the determined additional performance information associated with the sending of the one or more highest-ranked messages to determine a next highest-ranked network portion;

reprioritize the remaining messages of the plurality of messages based upon the undated ran king of each network portion; and send one or more next-highest-ranked messages to intended destination devices in the next-highest-ranked network portion.

* * * * *